Oct. 7, 1941.  L. C. DOANE  2,258,353
LIGHTING APPARATUS
Filed July 8, 1939    2 Sheets-Sheet 1
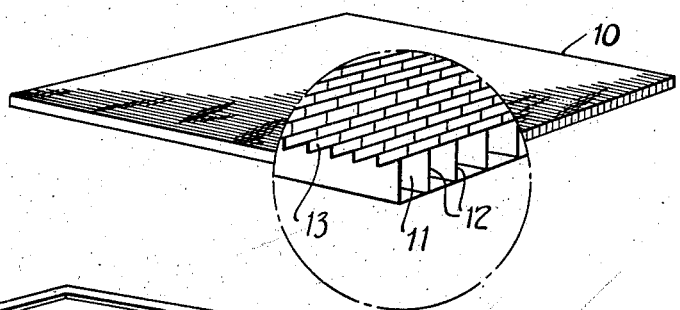
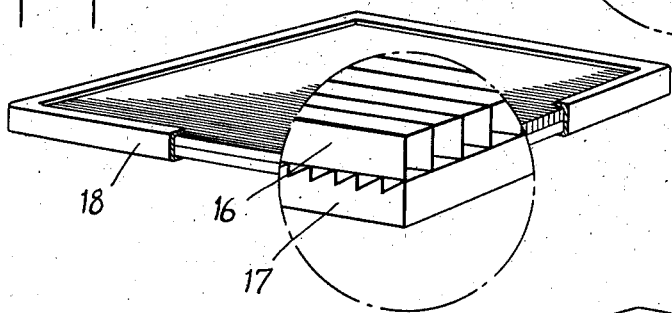
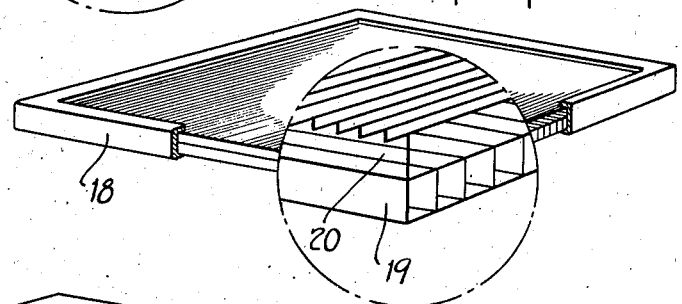
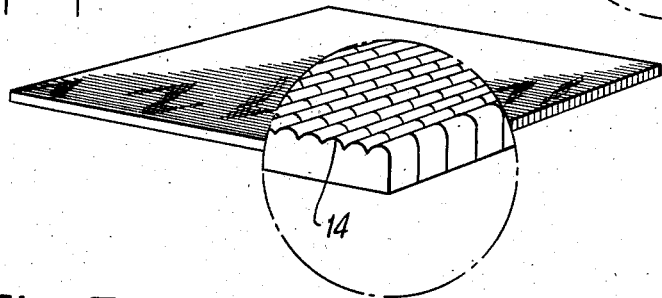
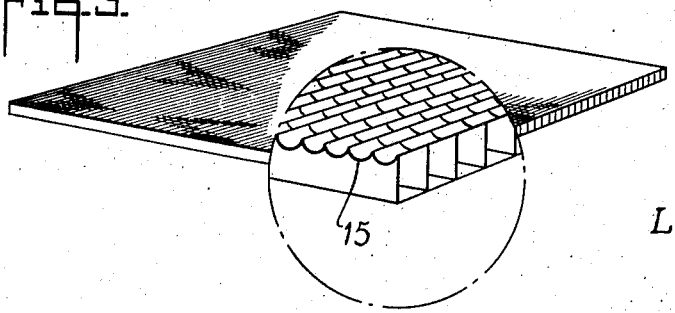
INVENTOR
Leroy C. Doane
BY
ATTORNEY Oct. 7, 1941.  L. C. DOANE  2,258,353
LIGHTING APPARATUS
Filed July 8, 1939  2 Sheets-Sheet 2

INVENTOR
Leroy C. Doane
BY
ATTORNEY

Patented Oct. 7, 1941

2,258,353

UNITED STATES PATENT OFFICE 2,258,353

LIGHTING APPARATUS

Leroy C. Doane, Meriden, Conn., assignor to The Doane Products Corporation, Meriden, Conn., a corporation of Connecticut Application July 8, 1939, Serial No. 283,344

6 Claims. (Cl. 240—93)

The present invention relates to lighting apparatus, and is more particularly directed toward light apparatus employing screens.

The present invention contemplates lighting apparatus adapted for direct lighting and employing louver screens made out of homogeneous material having alternate wide transparent areas for direct transmission of light and narrow thin light modifying areas for limiting the spread of directly transmitted light in planes transverse of the transparent areas, and wherein suitable scorings are disposed transversely of the transparent areas to provide a light deviating profile which effects controlled deviation of the light in planes parallel with the transparent areas. These scorings are narrow and shallow and may be in the form of flutes where it is desired to deviate the light rays in both directions from the directions of incident rays, or may be in the form of prisms where it is desired to control the convergence or the divergence of the light or to secure a uniform deviation of the light rays in the same direction from the incident rays. These scorings in addition to effecting a controlled deviation of the light act, in cooperation with the light modifying areas to obscure the light source, lighting fixture frames and other interior parts against observation through the screen.

Other and further objects will appear as the description proceeds.

The accompanying drawings show, for purposes of illustrating the present invention, several embodiments of screens for use in lighting fixtures together with a typical lighting fixture employing such a screen, it being understood that the drawings are illustrative of the invention rather than limiting the same.

In these drawings:

Figure 1 is a perspective view illustrating a louver screen with prisms on one surface;

Figure 2 is a perspective view showing a louver screen with an opposed sheet of material having prisms facing the louvered material;

Figure 3 is a view similar to Figure 2, wherein the prisms are on the side opposite the louvered material;

Figures 4 and 5 are views similar to Figure 1 showing sheets of louvered material with embossed scorings in the form of flutes;

Figure 7:
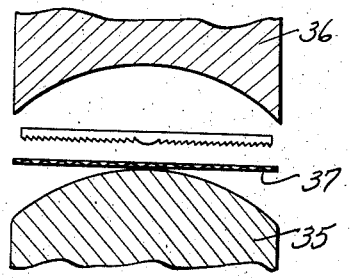
Figure 8:
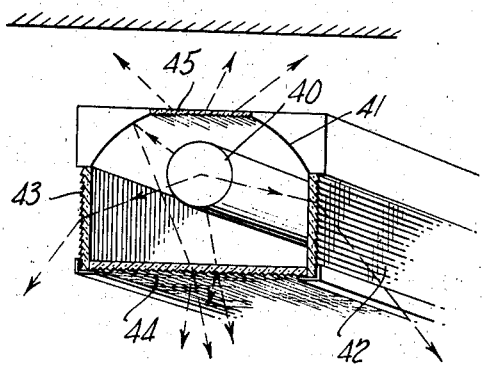
Figure 9:
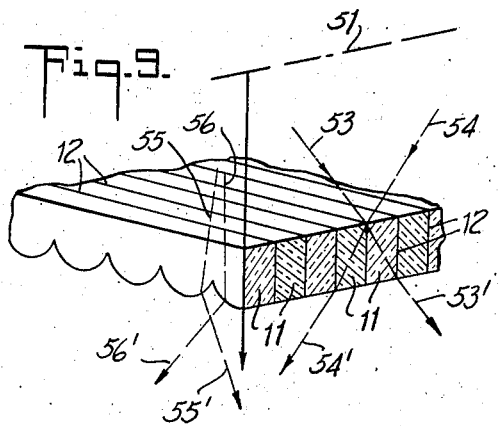

Figure 7 diagrammatically illustrates bending of the embossed sheet;

Figure 8 illustrates a luminair employing the prismatic and ribbed louvered material; and Figure 9 is a diagrammatic illustration showing the paths of light rays.

The louver sheet 10 shown in Figure 1 consisted originally of a sheet of thermoplastic material having alternate wide transparent areas 11 and narrow translucent or light modifying areas 12. The transparent areas are preferably one-half to two-thirds of the thickness of the sheet. Such sheet may be made by assembling alternate layers of clear transparent plastic and thin sheets of translucent plastic, molding them together to form a mass and then shearing the mass transversely to provide sheets of material in which the transparent or translucent light modifying areas extend from face to face. The sheet is polished to secure a smooth surface. The material may also be made according to the disclosure of my pending application Serial No. 250,979 filed January 14, 1939.

Figure 6:
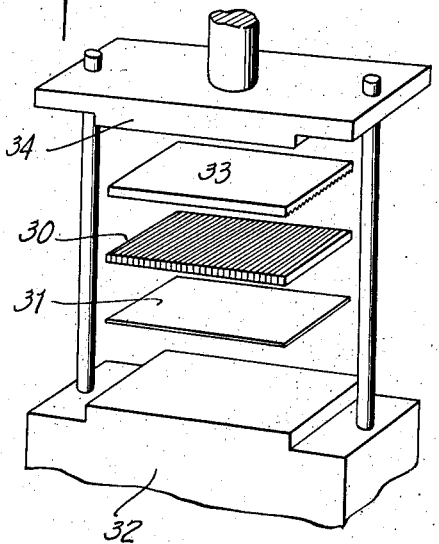
Figure 6 illustrates the embossing of the sheet to produce the scorings.

This sheet of louver material is then subjected to heat and pressure in a mold as illustrated in Figure 6. The plunger (or the mold) has the reverse of scorings of the desired contour to produce the prisms 13 (or the flutes 14 or 15 of Figures 4 and 5). Owing to the fact that the material can be worked at comparatively low temperatures it is possible to employ molding apparatus with accurately ground, highly polished surfaces, with sharp angles so that the resulting prisms (or flutes) are of a very high degree of accuracy, even though their width and depth is small. For example, the material can be provided with prisms of the order of a thirty-second of an inch in width which gives very accurate light control. Where it is desired to obtain controlled deviation of light rays in both directions the plunger is provided with scorings which will produce convex flutes such as 14 in Figure 4, or concave flutes such as 15 in Figure 5.

The screens of Figures 1, 4 and 5 will all have the property of transmitting direct light through the transparent areas with a deviation in planes parallel with the length of the transparent areas controlled by the contour or profile of the scorings employed. The spread of light in planes transverse of clear and translucent areas of the louver material will be determined by the spacing of the light modifying areas 12 and the thickness of the plate. This will ordinarily be such as to give a 45° maximum divergence of light rays.

In some instances it is desirable to employ a screen of double thickness. Such screens are shown in Figures 2 and 3. In Figure 2 the upper thickness of the screen illustrated at 16 comprises a sheet of louver material such as above described but without prisms, and the lower part of the screen illustrated at 17 comprises a sheet of plastic material having embossed on it prisms similar to those above described. This sheet 17 may be a clear sheet of plastic as illustrated. The two sheets are held together by a supporting frame such as illustrated at 18, the shape of which will vary according to the shape of the screen to be employed.

In the arrangement shown in Figure 3 the lower part of the screen 19 is in the form of a sheet of louver material and the upper part 20 is in the form of the plastic sheet with embossed prisms. Where the prisms face away from the louvered material as in Figure 3, the two pieces may be held together by the frame 18 or by cementing them together.

Figure 6 illustrates the forming of the scored or embossed plastic sheet. A rough sheet of louvered material as sheared from the block is illustrated at 30. It is placed on a polished steel plate 31 adapted to rest on the fixed heated plate 32 of a press. A scored plate 33 is placed on top of the sheet of louvered material and pressure applied by an upper movable heated plate 34. This smoothes the lower surface of the sheet and gives it the desired polish and produces the polished scorings on the upper surface of the plastic sheet.

Where it is desired to provide the sheets with a contour other than fluted, the sheets are heated and placed between wooden forms or blocks indicated at 35 and 36 in Figure 7. The ribbed or scored surface of the sheet is protected by a layer of cloth 37. The sheet may be readily deformed to the desired shape without substantially affecting the scorings.

Figure 8 illustrates a lighting fixture having a long light source 40, a downwardly acting reflector 41, a lower closure having sides 42 and 43 composed of louver material with parallel prisms for downwardly refracting the light rays, a bottom plate 44 of fluted material to secure diffusion, and an upper plate 45 of prismatic material to secure wider spread of light on a ceiling.

Figure 9 illustrates the typical action of the material in obscuring light sources and other objects, such as reflectors, fixture frames, sockets, unlighted lamps and the like. A piece of fluted louver material is indicated at 50 and a long light source at 51. Light rays, such as 53 and 54, pass through the wide transparent areas 11 of the louvered material and the angles of divergence of the rays 53' and 54' are determined by the thickness of the plate and the width of the transparent areas. It is thus apparent that in planes lengthwise of the light source it will be screened from observation in angles outside of zones of direct rays. Light rays which will be transmitted through the wide transparent areas without interference by the translucent areas will, however, be deviated according to the formation of the scorings on the plate, for example, rays such as indicated at 55 and 56, will be diverted so as to cross as indicated at 55' and 56'. These flutings or scorings will therefore effect a redistribution of the transmitted light so that the interior constructions are completely obscured from observations and directions in which the light can be transmitted. Light sources, reflectors, frames and other fixture elements are therefore not noticeable when observing the fixture either when lighted or unlighted.

It is obvious that the invention may be embodied in the several forms and constructions illustrated in the drawings and to such other modifications that may be within the spirit of the invention, or its scope as claimed.

What is claimed is:

1. An elongated louver screen for use with linear light sources comprising a sheet of homogeneous material having substantial thickness and formed to provide transverse transparent portions for direct transmission of light and alternate relatively narrow light modifying portions, constituting the louvers of said screen, for limiting the spread of directly transmitted light along the length of the screen, one face of the sheet having relatively small prisms extending lengthwise of the screen to provide a light refracting profile which effects a controlled deviation of the light in planes transverse to the length of said screen.

2. A screen such as claimed in claim 1, wherein said prisms are in the form of parallel convex flutes.

3. A screen such as claimed in claim 1, wherein said prisms are in the form of parallel concave flutes.

4. A screen such as claimed in claim 1, wherein the width of the prisms is less than the width of the transparent portions.

5. A lighting fixture comprising a linear light source, and a louver screen, the screen being in the form of a sheet of homogeneous material having substantial thickness and formed to provide wide transparent portions for direct transmission of light and alternate relatively thin light modifying portions, constituting the louvers of said screen, for limiting the spread of directly transmitted light rays in planes including the axis of said light source, one face of the sheet having relatively small prisms extending in a direction parallel to the axis of said light screen to provide a light refracting profile which effects a controlled deviation of the light transverse to the axis of said light source, the prisms and light modifying portions preventing observation of the source or other objects through the screen.

6. A lighting fixture comprising a linear light source, and a screen which includes a sheet of homogeneous material having substantial thickness and formed to provide wide transparent portions for direct transmission of light and alternate relatively thin light modifying portions for limiting the spread of directly transmitted light in planes including the axis of said light source, the screen also having prisms extending in a direction parallel to the axis of said light source and to provide a light refracting profile which effects controlled deviation of light in planes transverse of the axis of said light source, and together with the light modifying portions preventing observation of the source or other objects through the screen.

LEROY C. DOANE.